(12) United States Patent
Mahalingam

(10) Patent No.: US 11,293,792 B2
(45) Date of Patent: Apr. 5, 2022

(54) DEVICE AND SYSTEM FOR FLUID FLOW MEASUREMENT

(71) Applicant: BAKER HUGHES ENERGY TECHNOLOGY UK LIMITED, Aberdeen (GB)

(72) Inventor: Sakethraman Mahalingam, Inverurie (GB)

(73) Assignee: Baker Hughes Energy Technology UK Limited, Aberdeen (GB)

( * ) Notice: Subject to any disclaimer, the term of this patent is extended or adjusted under 35 U.S.C. 154(b) by 0 days.

(21) Appl. No.: 16/306,849

(22) PCT Filed: Jun. 7, 2017

(86) PCT No.: PCT/EP2017/063853
§ 371 (c)(1),
(2) Date: Dec. 3, 2018

(87) PCT Pub. No.: WO2017/211894
PCT Pub. Date: Dec. 14, 2017

(65) Prior Publication Data
US 2019/0301905 A1 Oct. 3, 2019

(30) Foreign Application Priority Data
Jun. 7, 2016 (GB) .................................. 1609905

(51) Int. Cl.
*F16K 31/02* (2006.01)
*G01F 1/684* (2006.01)
(Continued)

(52) U.S. Cl.
CPC ............ *G01F 1/6842* (2013.01); *G01F 1/684* (2013.01); *G01F 1/6847* (2013.01);
(Continued)

(58) Field of Classification Search
CPC ...... G01F 1/6842; G01F 1/684; G01F 1/6847; G01F 1/6888; G01F 1/69; G05D 7/0617
(Continued)

(56) References Cited

U.S. PATENT DOCUMENTS 3,927,567 A * 12/1975 Novak ............... G01F 1/684
73/204.21
4,016,758 A 4/1977 Taylor
(Continued)

FOREIGN PATENT DOCUMENTS

EP 1128168 A2 8/2001
EP 3037791 A1 6/2016
(Continued)

OTHER PUBLICATIONS

GB Search Report issued in connection with corresponding GB Application No. 1609905.3 dated Nov. 23, 2016.
(Continued)

*Primary Examiner* — Minh Q Le
(74) *Attorney, Agent, or Firm* — Crowe & Dunlevy, P.C.

(57) ABSTRACT

A device for measuring the rate of flow of a fluid comprising. The device includes a heating element, a housing, and a detector. The heating element is located in an interior of the housing, the housing defining a first thermal path from the heating element to a first region of an exterior of the housing and a second thermal path from the heating element to a second region of the exterior of the housing. The detector is configured to detect a property associated with transfer of heat from the heating element to the exterior of the housing. The first thermal path has a first thermal conductivity and the second thermal path has a second thermal conductivity. The first thermal conductivity is greater than the second thermal
(Continued)

conductivity. The first region of the exterior of the housing is smaller than the second region of the exterior of the housing.

22 Claims, 9 Drawing Sheets

(51) Int. Cl.
G01F 1/688 (2006.01)
G01F 1/69 (2006.01)
G05D 7/06 (2006.01)

(52) U.S. Cl.
CPC .............. *G01F 1/6888* (2013.01); *G01F 1/69* (2013.01); *G05D 7/0617* (2013.01)

(58) Field of Classification Search
USPC ......... 137/487.5; 73/204.22, 204.26, 204.16, 73/204.23, 204.18, 204.17
See application file for complete search history.

(56) References Cited

U.S. PATENT DOCUMENTS

| | | | |
|---|---|---|---|
| 4,745,805 A * | 5/1988 | Granier | G01N 33/0098 47/1.01 R |
| 4,932,256 A | 6/1990 | Buck et al. | |
| 4,986,122 A * | 1/1991 | Gust | E21B 21/08 73/1.29 |
| 5,119,674 A * | 6/1992 | Nielsen | A61B 5/028 73/204.17 |
| 5,339,688 A * | 8/1994 | Johansson | G01F 1/684 73/204.22 |
| 5,880,365 A | 3/1999 | Olin et al. | |
| 6,658,931 B1 * | 12/2003 | Plumb | G01F 1/698 73/204.15 |
| 7,387,022 B1 * | 6/2008 | Korniyenko | G01F 1/6842 73/204.11 |
| 9,182,261 B1 * | 11/2015 | Chen | G01F 1/684 |
| 9,528,868 B2 * | 12/2016 | Kharsa | G01F 1/69 |
| 9,880,038 B2 * | 1/2018 | Wittmer | G01N 27/4166 |
| 2001/0032503 A1 * | 10/2001 | Schrittenlacher | G01F 1/684 73/204.11 |
| 2002/0023486 A1 * | 2/2002 | Watanabe | G01F 1/684 73/202.5 |
| 2005/0223828 A1 | 10/2005 | Olin et al. | |
| 2007/0246192 A1 * | 10/2007 | Cunningham | H01L 21/67109 165/96 |
| 2009/0260431 A1 | 10/2009 | Olin et al. | |
| 2010/0170483 A1 * | 7/2010 | Wienand | G01F 1/6842 123/568.12 |
| 2012/0103087 A1 * | 5/2012 | Nakanishi | G01F 1/6842 73/272 R |
| 2013/0092257 A1 * | 4/2013 | Yasuda | G01F 25/0053 137/487 |
| 2013/0269428 A1 * | 10/2013 | Baur | H01L 29/401 73/204.26 |
| 2014/0230925 A1 * | 8/2014 | Halimi | G05D 16/20 137/487.5 |
| 2014/0352424 A1 * | 12/2014 | Morino | F02D 41/187 73/204.18 |
| 2016/0025542 A1 | 1/2016 | Satoshi et al. | |
| 2016/0202200 A1 * | 7/2016 | Nakano | G01N 27/18 73/23.31 |
| 2018/0172494 A1 * | 6/2018 | Rohring | B05C 5/0254 |
| 2019/0041248 A1 * | 2/2019 | Yamazaki | G01F 1/6888 |
| 2019/0086248 A1 * | 3/2019 | Yamazaki | G01F 1/684 |
| 2020/0032494 A1 * | 1/2020 | Trescott | G01F 1/696 |

FOREIGN PATENT DOCUMENTS

| | | |
|---|---|---|
| GB | 1312828 A | 6/1969 |
| JP | 2006283765 A | 10/2006 |

OTHER PUBLICATIONS

PCT Search Report and Written Opinion issued in connection with corresponding Application No. PCT/EP2017/063853 dated Sep. 7, 2017.

* cited by examiner

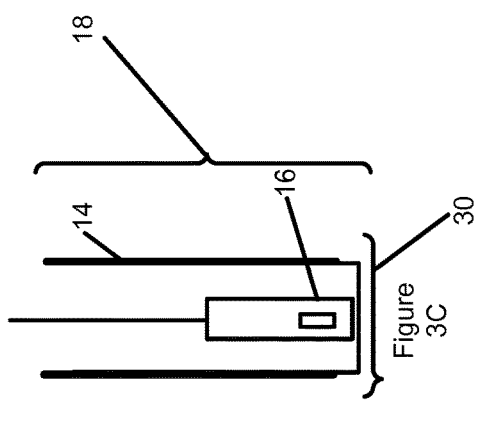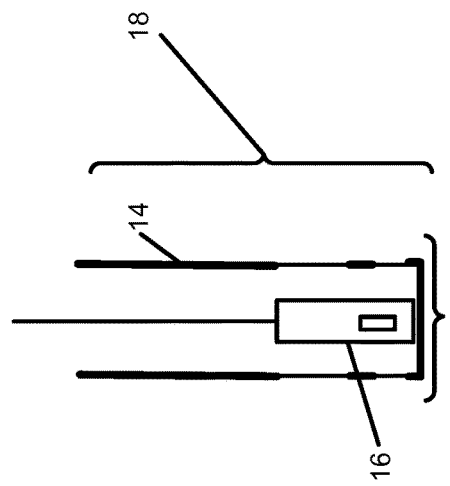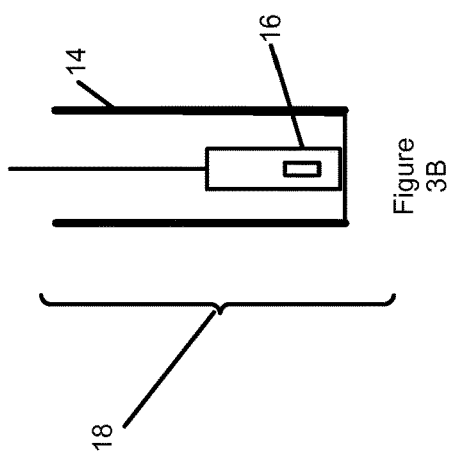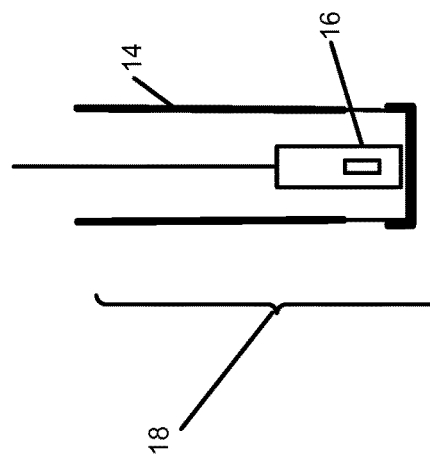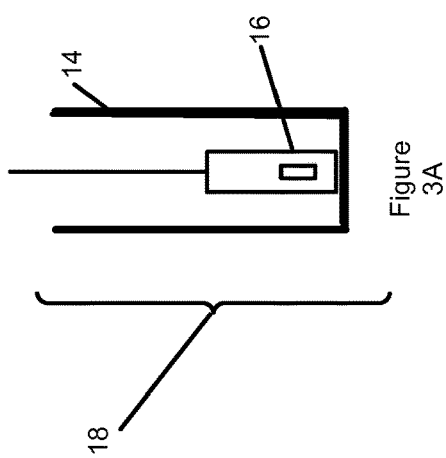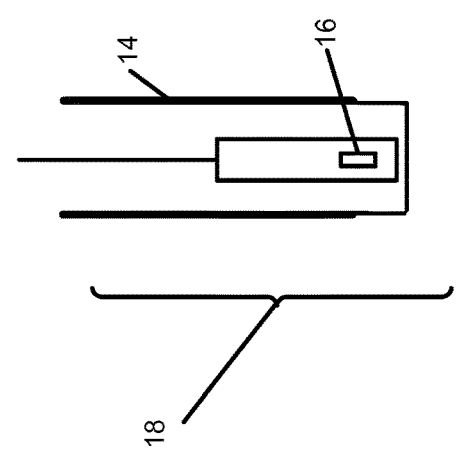

DEVICE AND SYSTEM FOR FLUID FLOW MEASUREMENT

FIELD OF THE INVENTION

The present disclosure relates to a device for measuring the rate of flow of fluids, and has application in the field of petrochemical flows, such as for example oil and gas fluid flows.

BACKGROUND OF THE INVENTION

The mass flow rate or flow rate of a fluid is an important quantity in many industrial applications. The mass flow rate or flow rate of a fluid is typically defined by the average velocity of the fluid multiplied by its mass density multiplied by the cross-sectional area of the conduit through which the fluid travels.

One known technique for measuring mass flow rate or flow rate of a fluid is using the cooling effect of a fluid in contact with a heated element. For example, hot wire sensors have been used to measure both mass flow rate and flow rate using a pair or more of hot wires. Typical hot wire sensors use a tungsten or platinum wire with a diameter of the order of five microns held between two components of the order of 2 mm apart. Temperature change is determined either using a temperature sensor or indirectly based upon change in resistance of the wire. Change in temperature can be used to determine mass flow rate or flow rate using known relationships between the temperature change and flow rate or mass flow rate. Form factors other than wires have also been used using the same principle, including hot films, thin tubes or a pointed needle.

Hot wire sensor designs work reasonably well when used in gases, but may suffer from disadvantages when exposed to liquids. For example, exposure to liquids can result in rapid deterioration of thin wires used in sensors. Additionally, fluids comprising liquids typically have a relatively increased thermal conductivity in comparison with gases, sometimes several orders of magnitude greater. For any given power input, the range of temperature variation for a given range of flow rate or mass flow rate of a sensor is therefore typically reduced for fluids comprising liquids since the cooling effect of the flow of the fluid or liquid across the sensor is increased due to the higher overall thermal conductivity of the fluid.

There therefore remains a need for improvements in devices for measuring the flow of fluids.

SUMMARY OF THE INVENTION

In a first aspect there is provided a device for measuring the rate of flow of a fluid. The device comprises: a heating element; a housing, the heating element being located in an interior of said housing, the housing configured to define a first thermal path from the heating element to an exterior of the housing and a second thermal path from the heating element to the exterior of the housing, the first and second paths having different thermal conductivities; and a detector configured to detect a property of the heating element associated with transfer of heat to the exterior of the housing.

In use, the device may be placed in a fluid, for example a liquid or a gas, such that the liquid or gas contacts the exterior of the housing. Heat generated at the heating element is conducted to the fluid along a plurality of thermal paths between the heating element and the exterior of the housing, and into the fluid. The first and second thermal paths provide different rates of transfer of heat from the heating element to the exterior of the housing and therefore the fluid. The first and second thermal paths may therefore be configured to control the transfer of heat to the fluid, which may be used to determine the flow rate of the fluid.

The housing provides an enclosing for the heating element, and may also enclose the detector. The housing therefore may provide protection for components of the device. It will, however, be appreciated that the housing may reduce the transfer of heat to a fluid. Such a reduction in the transfer of heat may result in an increase in heat required to be generated by the heating element in order to provide a corresponding sensitivity to change in transfer of heat arising due to differences in flow of the fluid. By providing a device in which thermal paths from the heating element are configured, it may be possible to reduce or avoid the need to increase the heat required to be generated by the heating element.

The housing may comprise a first portion associated with the first thermal path and a second portion associated with the second thermal path. The first portion may have a thermal conductivity different to the second portion. The first portion and second portion may be portions of the housing that are provided so as to configure the thermal conductivity of the respective first and second thermal paths. For example, the first and second portions may be corresponding portions of the housing that lie in the respective thermal paths and the first and second portions may have respective thermal properties that modify the respective thermal paths. For example, the first and second portions may comprise first and second materials, the first material being different to the second material.

At least one of the first and second portions may comprise a thermal barrier coating. The housing may comprise an outer shell surrounding the heating element. At least one of the first and second portions may comprise a portion of the outer shell. At least one of the first and second portions may comprise a portion between the heating element and an interior of the outer shell.

The first and second portions may be portions lying in the thermal path between the heating element and the exterior of the housing.

By varying properties of the first and second portions the thermal conductivity of the thermal paths may be modified. For example, in a design phase of the device the first and second portions may be assigned properties to achieve a desired overall thermal conductivity of the thermal path in which the portions lie. The property of the first and second portions may be a material composition and/or a coating selected based upon the thermal conductivity of the material composition. The first and second portions may be a point lying along the thermal path defining a point in three-dimensional space and/or a length of the thermal path defining a vector in three-dimensional space. Additionally or alternatively, first and second portions may define respective volumes in three-dimensional space. For example, the thermal paths may define a cross-sectional area extending from the heating element to the exterior of the housing and the first and second portions may be volumes associated with the cross-sectional areas.

The property may be a temperature. The heating element and detector may comprise a thermocouple or platinum resistance thermometer.

Additionally or alternatively, the property may be an electrical resistance of the heating element. A temperature coefficient of resistance (TCR) and/or power coefficient of resistance (PCR) of the heating element may be determined and the resistance detected by the detector may be used to determine a temperature value using the PCR and/or TCR, for example using stored data mapping electrical resistance to temperature.

The device may be configured to be inserted in a conduit. The housing may comprise an exposed portion which, in use, is exposed to fluid within the conduit and an external portion which, in use, is external to the conduit. The first thermal path and the second thermal path may be from the heating element to respective exterior portions of the exposed portion of the housing. The external portion may comprise a radiant barrier material.

Each thermal path from the heating element to a first region of the exterior of the housing may be associated with a first thermal conductivity, and each thermal path from the heating element to a second region of the exterior of the housing is associated with a second thermal conductivity, wherein the first thermal conductivity is greater than the second thermal conductivity. The first region of the exterior of the housing may be smaller than the second region of the exterior of the housing. The first region may be adjacent to at least one of the heating element and the detector. The first region may define a thermally conductive window.

The device may further comprise an analysis module arranged to receive the property and to generate a measure of flow of fluid based upon the property. For example, data indicating known relationships between the property and flow of fluid may be accessed by the analysis module to provide a measure of flow of fluid. The relationships may, for example, be empirically determined using the device by locating the device in a conduit containing a particular fluid at a particular flow rate and measuring the property. The relationships may alternatively be determined based upon known properties of the device and fluid thermal transfer properties.

The fluid may, for example, be oil, gas, water and/or a combination of oil, gas and/or water together with other fluids.

A property of the heating element may be configured based upon the first and second thermal paths. The property may be associated with generation of heat of the heating element. The property may be a heat output, power output or power density of the heating element. For example, the configuration of the housing to provide first and second thermal paths may allow the heating element to be configured to provide a lower output of heat than a device without configuration of the housing to provide the first and second thermal paths.

In a second aspect there is provided a system for controlling rate of flow of a fluid in a conduit, the system comprising: a device for measuring the flow of fluid; and a controller arranged to control flow of the fluid in the conduit based upon output of the device. the device comprises: a heating element; a housing, the heating element being located in an interior of said housing, the housing defining a first thermal path from the heating element to an exterior of the housing and a second thermal path from the heating element to the exterior of the housing, the first and second paths having different thermal conductivities; and a detector configured to detect a property associated with transfer of heat from the heating element to the exterior of the housing.

The system may further comprise the conduit. The device may be adapted to be received in an opening in the conduit.

In a third aspect there is provided a device for measuring the rate of flow of a fluid comprising: a heating element; a housing, the heating element being located in an interior of said housing, the housing defining a first thermal path from the heating element to a first region of an exterior of the housing and a second thermal path from the heating element to a second region of the exterior of the housing; and a detector configured to detect a property associated with transfer of heat from the heating element to the exterior of the housing; wherein the first thermal path has a first thermal conductivity and the second thermal path has a second thermal conductivity; wherein the first thermal conductivity is greater than the second thermal conductivity; and wherein the first region of the exterior of the housing is smaller than the second region of the exterior of the housing.

It will be appreciated that the term "thermal path" means a path along which heat would flow when driven by a temperature difference. In embodiments of the present invention, heat is generated by the heating element, and is transferred into the fluid via the materials which make up the housing of the device. Heat will permeate more easily in materials having a high thermal conductivity compared to materials having a low thermal conductivity. As such, the presence of low thermal conductivity materials will resist heat transfer, whereas the presence of high thermal conductivity materials will promote heat transfer. It will be appreciated that because the first region of the exterior of the housing has a higher thermal conductivity than the second region of the exterior of the housing, heat transfer through the first region is promoted, and heat transfer through the second region is resisted. As such, the heat produced by the heating element is concentrated in the first region, and therefore the heating element requires less power to be able to determine the velocity of the fluid.

The power density of heat transferred through the first region of the exterior of the housing may be greater than the power density of heat transferred through the second region of the exterior of the housing. As such, the overall power required by the heating element is decreased. It will be appreciated that the term "power density" is intended to mean the amount of power transmitted through the first and/or second regions of the exterior of the housing per unit area.

The first and second thermal paths may be paths of heat conduction. That is to say, the first and second thermal paths are defined by the flow of heat away from the heating element via conduction.

The heating element may be enclosed within a rigid carrier positioned in the interior of the housing. When the carrier is rigid, the location of the heating element relative to the exterior of the housing can be precisely controlled in comparison to embodiments of the device in which the heating element is packed within a powder. As such, the device can be calibrated more easily. It will be appreciated that by "rigid", it is intended that the carrier has a solid construction, the geometry of which can be precisely controlled by manufacturing processes such as casting, machining, or the like. It will be appreciated that by "enclosed" it is meant that the heating element is substantially surrounded by the carrier.

The carrier may comprise a material having a thermal conductivity greater than about 300 $W \cdot m^{-1} \cdot K^{-1}$, such as for example copper and/or gold. It will be appreciated that copper and gold are excellent conductors of heat. When the carrier is composed of copper and/or gold, heat generated by the heating element is able to permeate through the carrier very easily. As such, the presence of any heat gradient within the carrier itself is eliminated, and therefore the accuracy of the device is increased.

The housing may comprise a shell within which the heating element is located, the shell being partially received within a sleeve. The first thermal conductivity may be determined by the material of the shell. The second thermal conductivity may be determined by the material of the sleeve. It will be appreciated that thermal transfer from the heating element to the fluid may therefore be resisted by the presence of the sleeve. As such, thermal transfer from the heating element to the fluid may be concentrated in the portion of the shell which is not received by the sleeve. It follows that the portion of the shell which is not received by the sleeve may be considered to define the first region of the exterior of the housing. The second region of the exterior of the housing may be at least partially defined by the sleeve, however it will be appreciated that further layers of material which are part of the housing may be disposed upon the sleeve to hold the sleeve in place.

The portion of the shell which is not received by the sleeve may be directly exposed to the fluid so as to define the first region of the exterior of the housing. Because the first region is exposed directly to the fluid, heat transfer from the heating element to the fluid via the first region is promoted.

The sleeve may be at least partially received within a body portion of the housing. As such, the body portion of the housing protects the sleeve from degradation.

The heating element and shell may define a first sensor, and the device may comprise a second sensor substantially identical to the first sensor. It will be appreciated that where the device comprises two sensors, in the event of the failure of one of the sensors the device will still be operable to determine the flow rate of the fluid.

At least one of the first and second sensors may comprise a thermocouple and/or platinum resistance thermometer. The thermocouple may be configured to measure the bulk temperature of the fluid. It will be appreciated that the bulk temperature of the fluid may be used to increase the accuracy of the fluid flow measurement. It will further be appreciated that the thermocouple or platinum resistance thermometer may be part of the detector.

The housing may comprise a protective cage configured to prevent solid materials carried by the fluid from contacting the first region of the exterior of the housing. The protective cage may extend axially beyond a terminal end of the shell of the first and/or second sensor. As such, damage to the first portion of the exterior of the housing may be prevented.

The property may be a temperature. The property may be an electrical resistance of the heating element. The device may be configured to be inserted in a conduit, and the housing may comprise an exposed portion which, in use, is exposed to fluid within the conduit and an external portion which, in use, is external to the conduit. The external portion may comprise a radiant barrier material.

The first region may be adjacent to at least one of the heating element and the detector. The first region may define a thermally conductive window.

The device may comprise an analysis module arranged to receive the property and to generate a measure of flow of fluid based upon the property. A property of the heating element may be configured based upon the first and second thermal paths.

In a fourth aspect there is provided a system for controlling rate of flow of a fluid in a conduit, the system comprising: a device for measuring the flow of fluid; and a controller arranged to control flow of the fluid in the conduit based upon output of the device; wherein the device comprises: a heating element; a housing, the heating element being located in an interior of said housing, the housing defining a first thermal path from the heating element to a first region of an exterior of the housing and a second thermal path from the heating element to a second region of the exterior of the housing; and a detector configured to detect a property associated with transfer of heat from the heating element to the exterior of the housing; wherein the first thermal path has a first thermal conductivity and the second thermal path has a second thermal conductivity; wherein the first thermal conductivity is greater than the second thermal conductivity; and wherein the first region of the exterior of the housing is smaller than the second region of the exterior of the housing.

The system may comprise the conduit and the device may be adapted to be received in an opening in the conduit.

In a fifth aspect there is provided a device for measuring the rate of flow of a fluid comprising: a heating element; a housing, the heating element being located in an interior of said housing; and a detector configured to detect a property associated with transfer of heat from the heating element to an exterior of the housing; wherein the heating element is enclosed within a rigid carrier positioned in the interior of the housing. The carrier may comprise a material having a thermal conductivity greater than about 300 $W \cdot m^{-1} \cdot K^{-1}$, such as for example copper and/or gold.

It will be appreciated that the features of the above aspects of the invention may be combined. For example, the device of the second and/or fourth aspects may comprise features of the device of the first and/or third and/or fifth aspects. It will be appreciated that the features of any of the above aspects may be combined with the features of any of the other aspects. In particular, the features of the devices of the first and/or third and/or fifth aspects may be combined. It will be appreciated that the advantages described above in relation to one of the aspects of the invention may apply to the equivalent features of any of the other aspects of the invention.

BRIEF DESCRIPTION OF THE DRAWINGS

FIGS. 3A-3F are diagrammatic representations of various device configurations;

DETAILED DESCRIPTION

Embodiments will now be described by way of example with reference to FIGS. 1 to 7.

Figure 1:
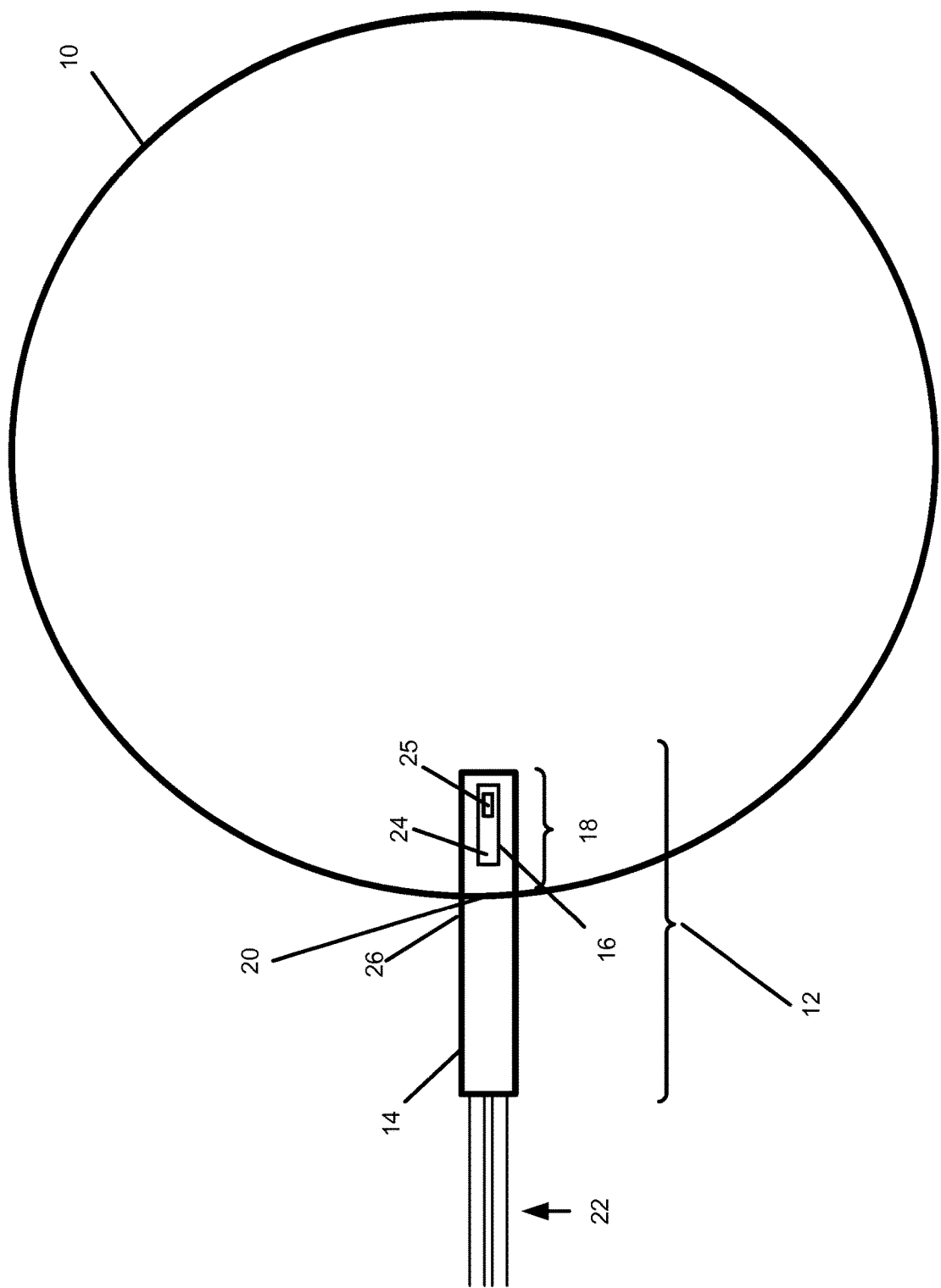
FIG. 1 is a diagram of an environment showing a device arranged within a conduit.

FIG. 1 illustrates a cross sectional view through a conduit 10 in which a sensor assembly 12 is provided for measuring flow of fluid in the conduit 10. The conduit 10 may be an oil or gas conduit 10 such as a surface pipeline or downhole tubing. Alternatively, conduit 10 could be any conduit suitable for transporting fluids and the sensor assembly could be used to measure the flow of different fluids such as blood, milk, water or chemicals in a number of industries from healthcare to power plants to the food industry.

The sensor assembly 12 comprises a body or housing 14 housing a sensor 16. The housing 14 is configured to be inserted in the conduit 10 such that an external surface of an exposed portion 18 of the housing 14 is exposed to the fluid in the conduit 10. For example, conduit 10 may be provided with an opening 20 arranged to receive an assembly such as sensor assembly 12 and the housing 14 may be configured for insertion in the conduit 10. The housing 14 may, for example, be cylindrical or tubular in shape, although other geometries may be used as will be recognised by those skilled in the art.

The sensor 16 is connected electrically via leads 22 to, for example, a control and monitoring module as will be described below. As described in further detail below, the sensor 16 comprises a heating element 24 arranged to generate heat within the housing 14 and a detector 25 arranged to detect a property associated with transfer of heat from the sensor assembly 12 to fluid in the conduit 10.

The sensor 16 may, for example, be a thermocouple or a platinum resistance thermometer (PRT) and the property associated with transfer of heat may be a temperature value that is continuously monitored to provide data indicating a rate of transfer of heat from the sensor assembly 12 to fluid in the conduit.

Alternatively, the property associated with transfer of heat may be a resistance of the heating element. A temperature coefficient of resistance (TCR) and/or power coefficient of resistance (PCR) of the heating element 24 may be determined such that the resistance detected by the detector 25 can be used to determine a temperature value using the PCR and/or TCR. The resistance may, for example, be determined based upon a relationship between input voltage and a measured current. The detector may, in some embodiments, be integrated with the heating element to provide an integrated temperature sensing element. For example, the heating element may comprise a wire that is provided with an input voltage and that generates heat. A resistance of the same wire may be determined and used to determine a temperature.

It will be appreciated that the sensor assembly 12 defines a plurality of thermal paths between the sensor 16 and the external surface of the exposed portion 18. Each of the plurality of thermal paths defines a path by which heat is transferred from the sensor 16 to the fluid in the conduit 10 when heat is generated by the heating element 24.

As will be understood, fluid flowing past the sensor 16 affects the transfer of heat away from the sensing arrangement 12. As the thermal conductivity of liquids is typically orders of magnitude higher than that of gases, the heat required to be generated by the sensing arrangement 12 in order to be effective in liquids is relatively high compared to gases. For example, a typical hot wire anemometer sensor for sensing flow of gas outputs 50 mW to a 5 micron diameter wire affixed between two prongs separated by a 2 mm distance. In order to provide the same sensitivity in a liquid having a thermal conductivity 100 times greater than the gas for which the sensor is designed, the sensor would require 5 W of power to be provided to the sensor. It will be appreciated that providing 5 W of power to a sensor using a thin wire is problematic.

As described in further detail below, the sensor assembly 12 is therefore configured such that a thermal conductivity of at least one thermal path is different to a thermal conductivity of a further thermal path. By configuring the sensor assembly in this way, the overall power density of the sensor assembly, that is, the overall power per unit of surface area through which heat is transmitted to the surrounding fluid, may be increased and the power that is required to be provided to the heating element of the sensor to generate heat may be reduced to achieve the same sensitivity.

A property of the heating element of the sensor may therefore be configured based upon the thermal paths from the heating element to the exterior of the housing of the sensing arrangement. For example, in some embodiments the housing may be configured such that a substantial proportion of thermal paths from the heating element to the exterior of the housing have a relatively low thermal conductivity and heat transfer to a fluid flowing around the exterior of the housing is thereby reduced relative to a device without thermal configuration. The reduction of overall thermal conductivity allows the heating element to be configured so that a reduced heat is generated by the heating element. For example, the heating element may be selected for the sensor assembly based upon the configuration of the housing.

Thermal conductivity of the thermal paths may be configured in any convenient way. For example, a thermal barrier coating 26 may be provided on a portion of the external surface of the exposed portion 18 so as to reduce heat transmission (and therefore thermal conductivity) between the outer surface of the housing 14 and the fluid. The thermal barrier 28 may be provided via, for example, electroplating, plasma spraying, moulding, sputtering, evaporation, chemical vapour deposition, plasma enhanced chemical vapour deposition, or any other suitable deposition method to provide the thermal barrier 28 onto the housing 14. Suitable thermal barrier coatings 28 include materials such as yttria stabilized zirconia (YSZ), mullite, rare earth oxides and metal-glass composites.

Additionally or alternatively, the exposed portion 18 of the exterior enclosure of the housing 14 may comprise a first portion of a first material and a second portion of a second material, the first and second materials having different thermal conductivities so as to configure the thermal conductivity between the external surface of the exposed portion 18 of the housing 14 and the fluid. For example, the first material may be a material with a relatively high thermal conductivity such as alumina or gold and the second material may be a material with a relatively low thermal conductivity such as yttria stabilized zirconia (YSZ) or mullite. The housing 14 may, for example, comprise a hollow tube of a low thermal conductivity material such as yttria stabilized zirconia (YSZ) or mullite and a portion of the hollow tube may be replaced with a material with higher thermal conductivity such as gold. For example, an end of the hollow tube may be sealed with a material of a high thermal conductivity. Alternatively, the end of the hollow tube may be sealed with material of low thermal conductivity and a cut-out portion may be provided in a side of the hollow tube, with the cut-out portion being sealed with a material of a high thermal conductivity.

Additionally or alternatively the thermal conductivity may be configured by providing materials with different thermal conductivities, such as those described above, between the sensor 16 and the housing 14 so as to modify the thermal conductivity between the sensor 16 and the housing 14. That is, the housing may comprise a hollow exterior shell and material of differing thermal conductivities may be provided inside the shell to vary thermal conductivity between the heating element and the exterior of the housing.

The unexposed part of the housing 14, i.e. the portion that is outside the conduit, may be covered with a radiant barrier material such as metallized films with low reflectivity and/or emissivity such that radiant heat transfer to and from outside sources of heat may be prevented. Such a barrier may thermally isolate the exposed part of the housing 18 from the outside of the conduit.

Figure 2:
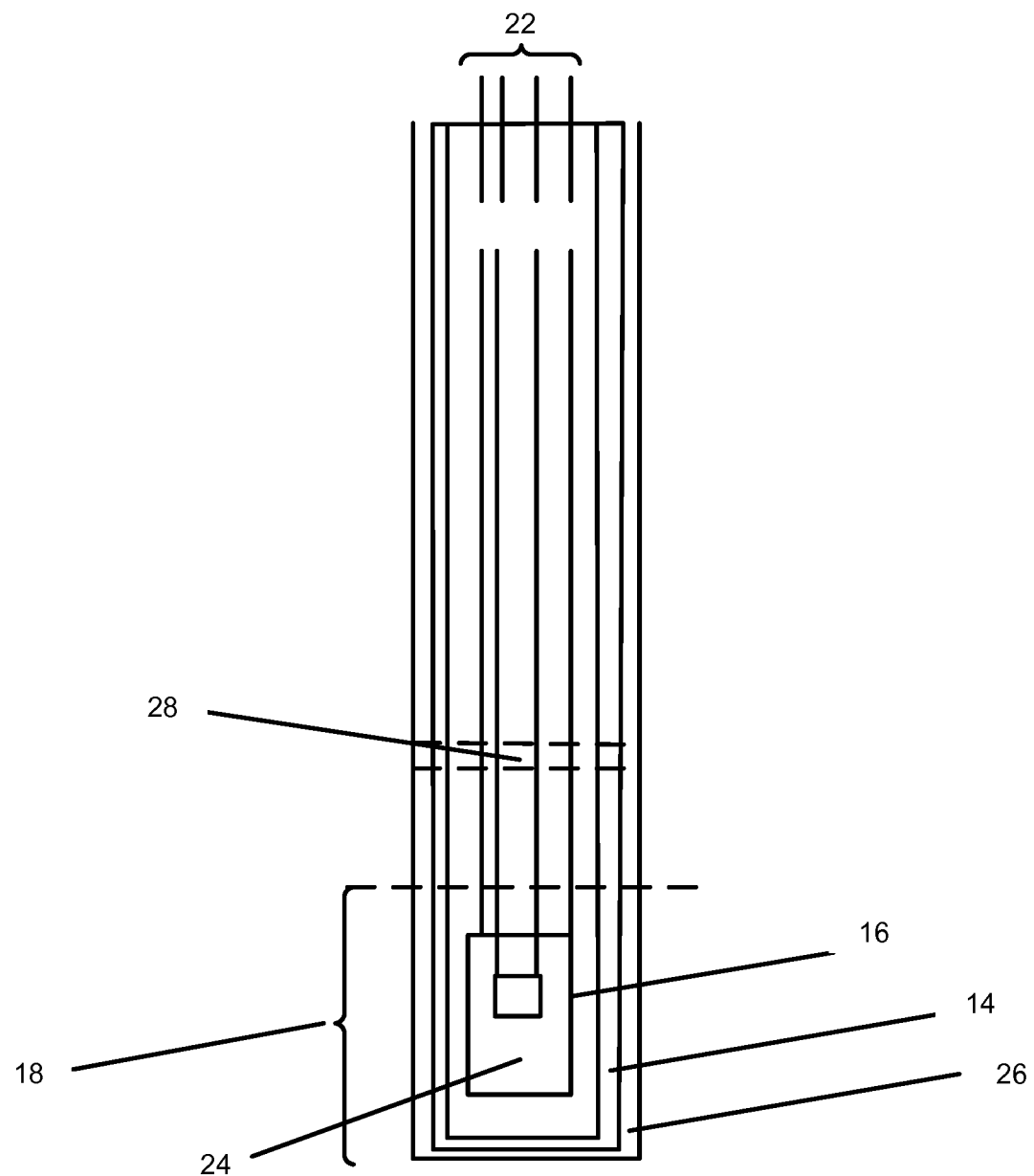
FIG. 2 shows an embodiment of a device.

FIG. 2 shows sensor assembly 12 in more detail. As described above, the housing 14 has an exposed portion 18 for exposure to the fluid when the sensor assembly 12 is arranged in a sensing configuration in a conduit 10 such as conduit 10 of FIG. 1. The exposed portion 18 is adapted to receive a sensor 16 and heat generated by the sensor 16 is thermally conducted by a plurality of thermal paths between the sensor 16 and fluid in the conduit 10. In particular, as described above, the sensor 16 comprises a heating element 24 arranged to generate heat within the housing 14 and a detector arranged to detect a property associated with transfer of heat from the sensor assembly 12 to fluid in the conduit 10.

In general terms, the sensor assembly uses the cooling effect of fluid flowing past the exposed portion 18 to determine the flow rate or mass flow rate of fluid flowing past the exposed portion. The cooling effect may be determined either directly by measuring a change in temperature associated with the sensing assembly 12, or may be determined indirectly, for example by measuring a change in power that is supplied to the heating element 24 in response to a detected temperature change associated with the sensing assembly 12, or a combination of both methods.

For example, as shown in FIG. 2, the sensor may comprise a heating element 24 and a temperature sensor 16. In operation, the heating element 24 may be provided with a constant power input that causes heat to be generated and temperature change may be detected by temperature sensor 16. The change in temperature caused by heating element 24 that is detected by temperature sensor 16 varies based upon flow rate of a fluid and the thermal conductivity, density, viscosity and specific heat capacity of the fluid such that the change in temperature may be processed to generate an indication of flow rate. The indication of flow rate may, for example, be determined based upon empirically measured temperature changes using the sensing arrangement at different flow rates or may be determined based upon other known relationships.

Alternatively, the temperature sensor 16 may be arranged in a feedback loop such that heating element 24 is controlled to maintain a constant temperature T at the sensor 16. For example, output of the sensor 16 may be provided to a controller arranged to control power supplied to the heating element 24 such that if a temperature detected at the sensor 16 is greater than T the controller reduces power supplied to the heating element 24 so as to reduce output of the heating element 24, and if a temperature detected at the sensor 16 is less than T the controller increases the power supplied to the heat source 24 so as to increase output of the heat source 24. Variation of power supplied to the heating element 24 may be used to determine flow rate in a similar manner to temperature.

The sensor 16 may be embedded in a thermal conductive compound (not shown in the Figure) filling the inner volume of the exposed portion 18 of the housing 14, as shown in FIG. 2. A sealant 28 may be provided to seal the sensor 16 in place, through which electrical leads 22 are passed to enable operation of, and to collect the output of the sensor 16. The sealant 28 may comprise a thermal insulator so as to restrict heat loss other than through the exposed portion 18.

As described above, the sensor assembly 12 is configured such that a thermal conductivity of at least one thermal path from the heating element 24 and the external surface of the portion 18 is reduced. In this way, thermal transfer of heat from the heating element 24 can be controlled and the power output from the heating element 24 can be reduced whilst achieving effective sensitivity in fluids that have a relatively high thermal conductivity such as liquids.

FIG. 3A shows a configuration of the end portion 18 that is not configured to provide different thermal paths from the heating element, and FIGS. 3B to 3F show various configurations of the end portion 18 of the device 12 enabling customisation of the device for various fluidic applications. In each of FIGS. 3B to 3F, a bold line indicates a portion of the housing having a relatively low thermal conductivity and a faint line indicates a portion of the housing having a relatively high thermal conductivity. The relative thermal conductivities may be provided in any convenient way as discussed above. Additionally, whilst a single wire is shown connecting the sensor 16 to other components in each of FIGS. 3A to 3F, it will be appreciated that various connections between sensor 16 and other components may be provided including but not limited to power and/or data connections to one or more of heating element 24 and detector 25.

FIG. 3B shows a configuration of the end portion 18 in which the base of the exposed portion 18 has a high thermal conductivity relative to the sides of the exposed portion 18. Transfer of heat from the sensor 16 is therefore reduced laterally and heat is generally transferred from the heating element 24 by a thermal transfer path that extends from the heating element 24 through the housing 14 having a high thermal conductivity relative to the sides of the housing 14.

FIGS. 3C and 3D each show a similar configuration to FIG. 3B in which the base of the exposed portion 18 of the housing 14 also has a high thermal conductivity relative to most of the sides of the exposed portion 18, but a portion of the sides of the exposed portion 18 of the housing 14 also has a relatively high thermal conductivity. The sensor 16 is therefore protected thermally laterally whilst being exposed to a window 30 of the housing 14 having a first or higher thermal conductivity when compared with the configuration of FIG. 3B.

FIGS. 3E and 3F each show a configuration in which a portion of the side of the exposed portion 18 has a high thermal conductivity relative to the base and the remainder of the sides of the exposed portion 18. FIG. 3E shows a single window laterally adjacent to the heating element 24, whereas FIG. 3F shows a window that extends around the heating element 24, but that is provided with a central portion that also has a relatively low thermal conductivity.

It will be appreciated that the configurations of FIGS. 3B to 3F are exemplary only and other configurations can be provided to tailor the configuration to specific applications. For example, analysis may be performed for a particular fluid to determine an effective configuration. By selectively patterning a thermal coating in this manner, application specific device designs can be implemented per application.

Those skilled in the art will recognise that the thermal conductivity of the coating 28, housing 14, potting compound and the inherent sensor 16 sensitivity may be simulated to provide an application specific design enabling the use of off the shelf sensors 16 in hitherto harsh application domains.

The different relative thermal conductivities described above may be provided by way of a thermally insulating coating 28 on external surfaces of the housing or may be provided in any convenient way, for example by providing thermally insulating material between the heating element 24 and the housing, or by configuring the housing 14 itself appropriately.

In each of the configurations of FIGS. 3B to 3F the portion of relatively high thermal conductivity is located close to or adjacent to the sensor 16. By providing the portion of relatively high thermal conductivity close to or adjacent to the sensor 16, transfer of heat from the heating element of the sensor is increased and the sensitivity of the sensor assembly may therefore be improved.

Figure 4:
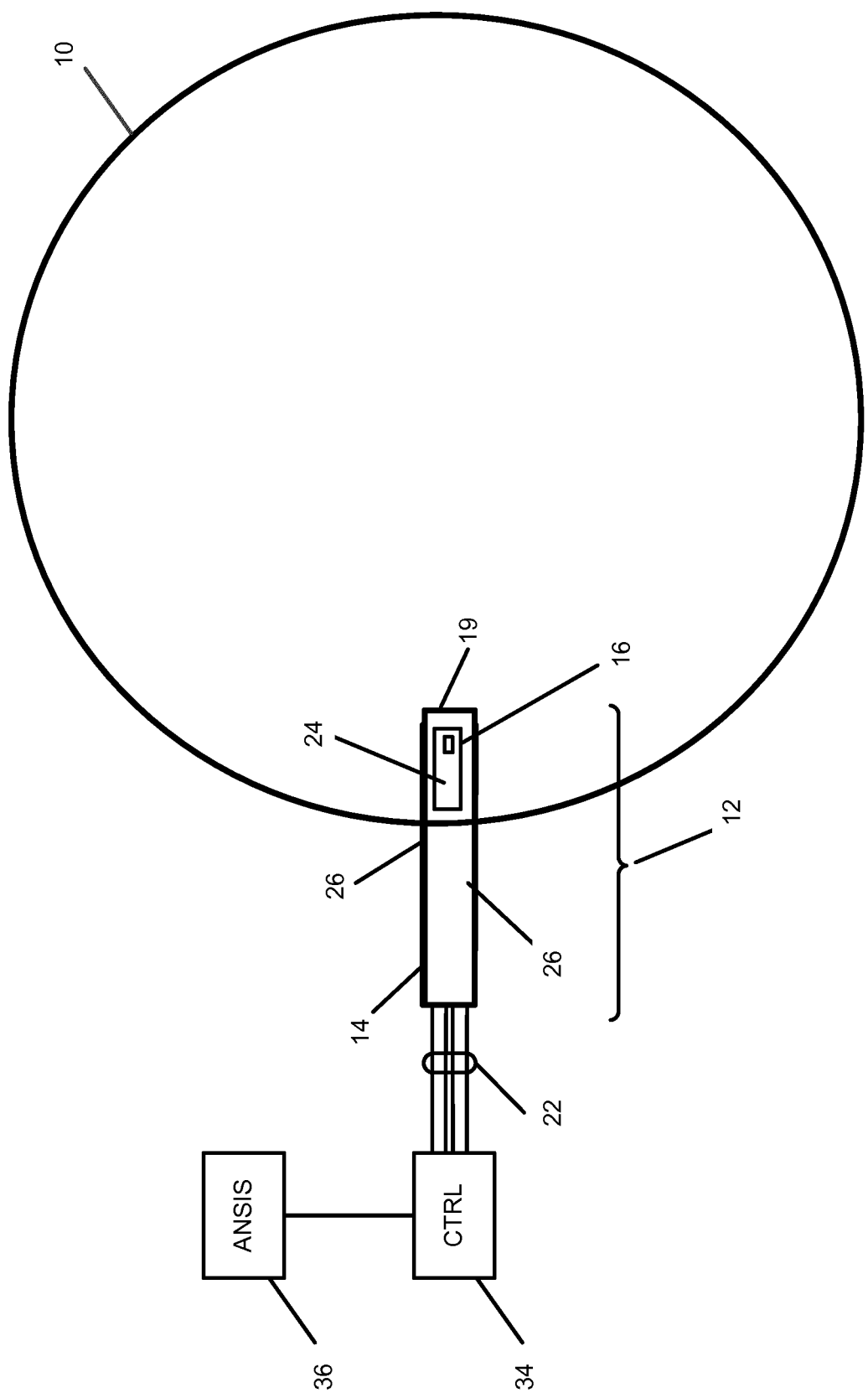
FIG. 4 shows a system employing the device.

FIG. 4 depicts an embodiment of a system for measuring fluid flow. The system comprises a sensing assembly 12 arranged within a conduit 10 for fluid flow as shown in FIG. 1. The system further comprises a control (CTRL) module 34 connected to an analysis (ANSIS) module 36. The control module 34 is in communication with the device 12 via for example leads or wires or databus 22 to provide fluid flow measurement. In some embodiments the sensing assembly 12 may be provided with a wireless interface to enable collection of sensor data as will be readily appreciated by those skilled in the art.

The control module 34 and analysis module 36 may be in the form of a personal computer or PC, or may be bespoke electronic modules 34 that monitor and feedback the output from the sensor 16 to a computer 36 for analysis. Typically, the analysis module 36 may provide calibration for a number of parameters of the sensor and its environment including density, viscosity, thermal conductivity, specific heat capacity, water content, salinity, power lost in lead wires, fluid temperature and ambient temperature that can be used to determine fluid flow rate. The analysis module may, for example, monitor output of the sensor 16 and generate a flow rate based upon the calibration parameters. The control module 34 may conduct periodical self-calibration of the sensor by turning off and/or altering the power levels of the heating element.

In an embodiment, the control module 34 may be connected to a control station (not shown in the Figure) to provide automatic feedback and control of fluid flow in the conduit 10 based on sensed readings.

Figure 5:
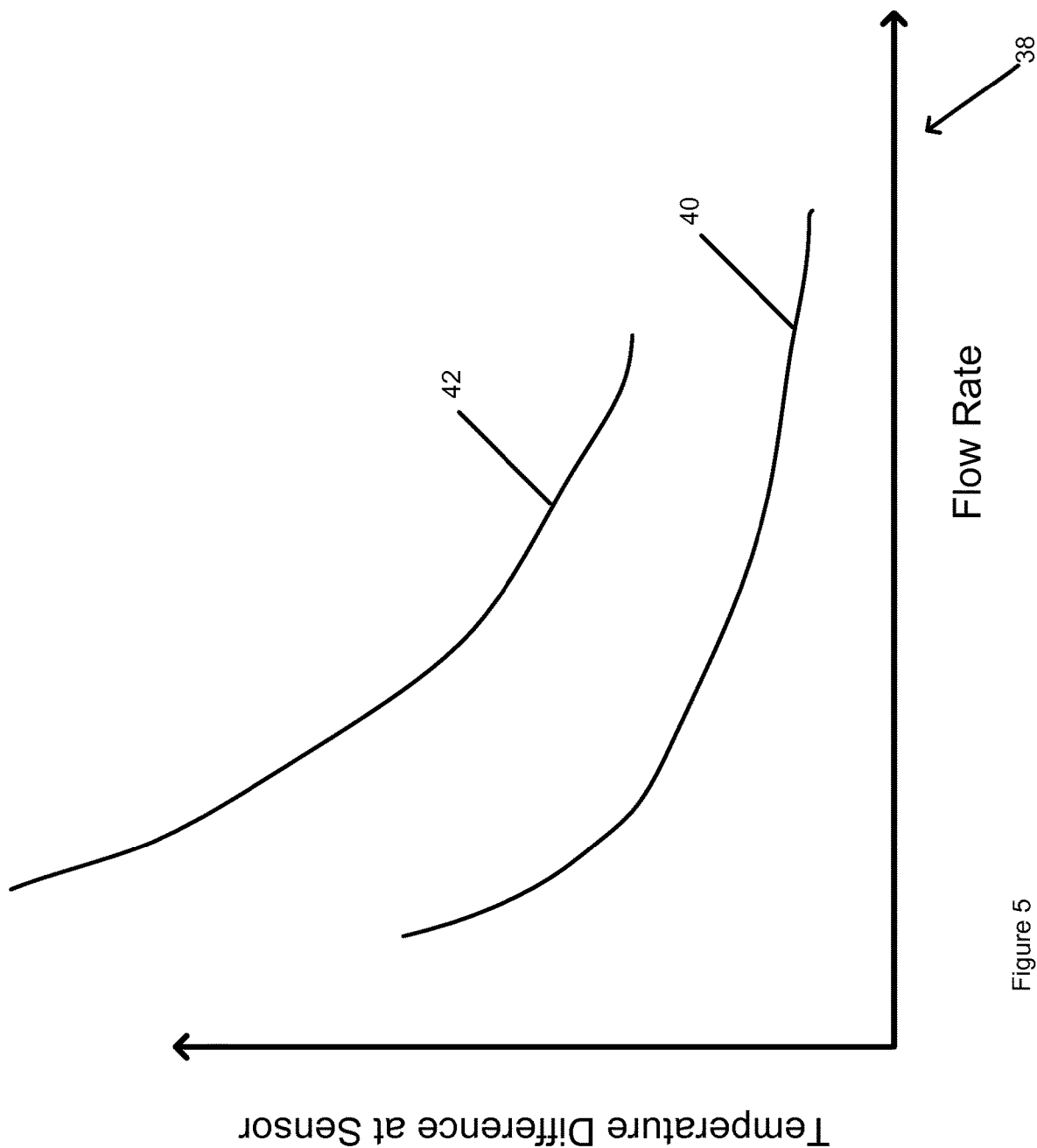
FIG. 5 is a graph illustrating sensitivity of two sensing arrangements.

FIG. 5 shows a graph 38 illustrating sensitivity of two sensing arrangements. The graph 38 illustrates flow rate in litres per minute plotted against temperature rise in ° C. for a constant power.

Lower trace 40 shows temperature rise relative to flow rate of a sensor assembly having a first portion of the exposed portion that has an area A having a relatively high thermal conductivity relative to a second portion of the exposed portion, and upper trace 42 shows temperature rise relative to flow rate of a sensor assembly having a first portion of the exposed portion that has an area A/2 having a relatively high thermal conductivity relative to a second portion of the exposed portion (i.e. half that of the sensor assembly of lower trace 40).

As can be seen from FIG. 5, the range of temperature associated with the sensor assembly 12 associated with upper trace 42 is higher than the range of temperature associated with the sensor assembly associated with lower trace 40 for the same range of flow rate. It will be appreciated that the higher range of temperatures for the same flow rate of the sensor assembly associated with upper trace 42 provides increased sensitivity relative to the sensor assembly associated with lower trace 40.

Those skilled in the art will appreciate that configuration of thermal paths allows an effective reduction in thermally conducting area for the same power input to the sensor, thereby leading to higher operating temperature ranges as shown in FIG. 5.

Figure 6:
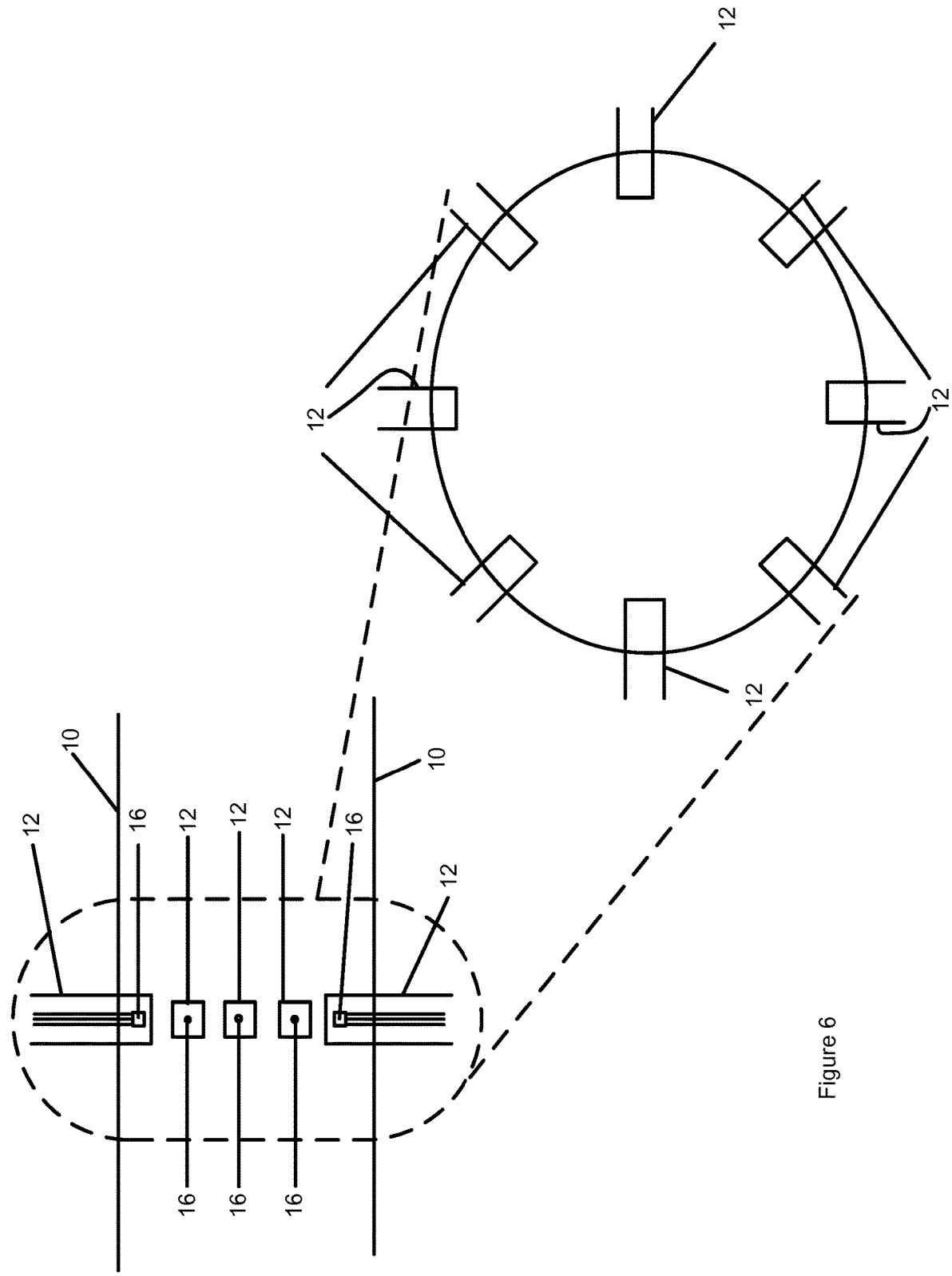
FIG. 6 illustrates an example configuration of devices applied to a pipeline or well.
Figure 7:
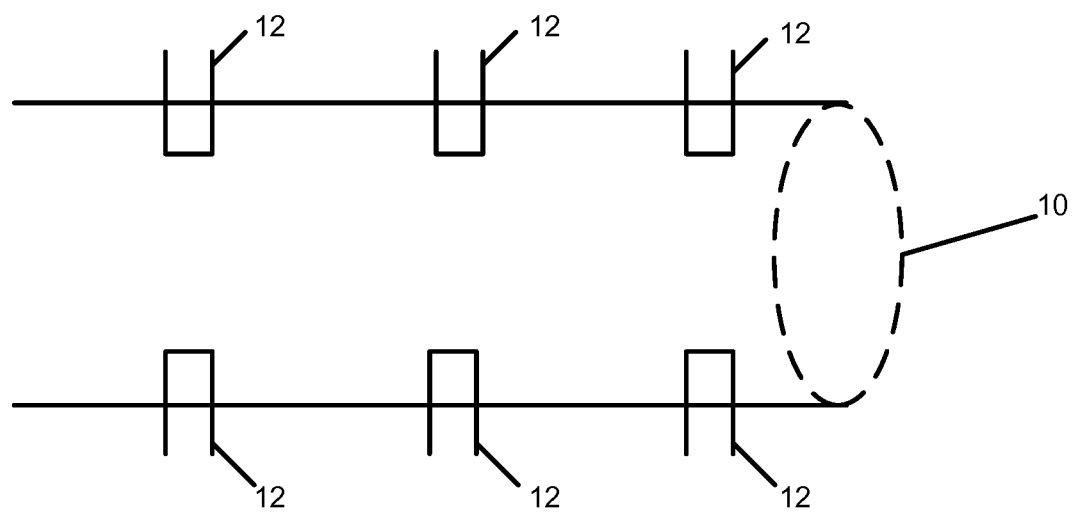
FIG. 7 depicts another example configuration of devices applied to a pipeline or well.

FIGS. 6 and 7 show various configurations of embodiments of sensor devices as described hereinbefore when applied to a conduit 10 such as a gas or oil pipeline 10.

FIG. 6 illustrates a plurality of devices 12 arranged in a concentric ring-like formation around the conduit 10. The same formation may be repeated at various intervals along the pipeline or well 10 to give an overall fluid flow profile of the flow rate of fluid passing through the pipeline or well.

FIG. 7 illustrates devices 12 employed longitudinally along the length of a pipeline 10, thereby providing sector by sector monitoring applications.

In some embodiments the ring-like configuration as shown in FIG. 6 may be repeated longitudinally along the pipeline or conduit 10, and combined with the longitudinal placement of FIG. 7 to provide detailed bulk and edge flow rates, thereby providing a 3D profile of the mass flow rate through the pipeline 10. Those skilled in the art will recognise that other sensor configurations may be employed about the pipeline or well.

In the above, a device or sensor assembly 12 for measuring the rate of flow of a fluid is described, the device 12 comprising a housing 14 having a first thermal conductivity, and further comprising an active portion 18 for exposure to a fluid, the active portion 18 being adapted to receive a sensor 16 therein, and wherein the active portion 18 is adapted to provide a lower thermal conductivity than the first thermal conductivity. A system comprising control and analysis modules in connection with one or more of the devices is also described.

Figure 8:
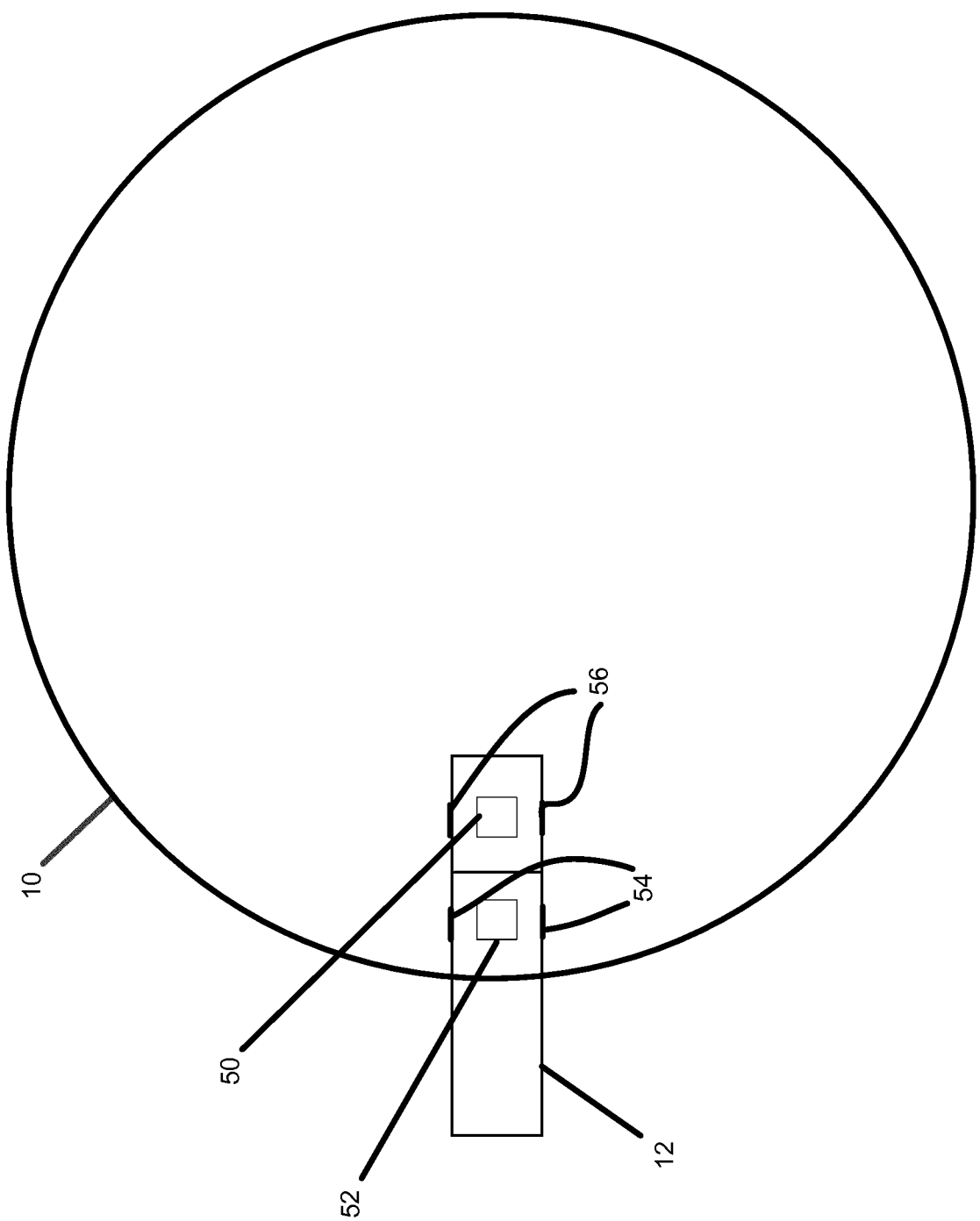
FIG. 8 schematically illustrates a further embodiment of a device.

It has been described above that a sensor assembly 12 comprises a sensor 16 comprising a heating element 24 arranged to generate heat within the housing 14 and a detector 25 arranged to detect a property associated with transfer of heat from the sensor assembly 12 to fluid in a conduit 10. As shown in FIG. 8, a sensor assembly may additionally or alternatively be provided with a first sensor 50 and a second sensor 52. Each sensor 50, 52 may comprise a respective heating element and a respective detector, each detector arranged to detect a property associated with transfer of heat from the respective heating element to fluid in the conduit 10.

The housing may be configured to provide housing portions 54, 56 associated with respective sensors 50, 52 that have a high thermal conductivity relative to all other portions of the housing so as to provide first and second sensing locations in the conduit, the first and second sensing locations being located at respective positions of the cross section of the conduit. By providing first and second sensors and associated sensing locations in this way, the sensor assembly may determine a plurality of flow rates within the conduit at different radial positions of the cross section of the conduit. Determining a plurality of flow rates in this way may permit additional properties of the flow of the fluid within the conduit to be determined, for example a determination of whether the flow is laminar or turbulent, based upon the plurality of determined flow rates.

It will be appreciated that flow at a plurality of sensing locations may alternatively be achieved using a plurality of separate sensor assemblies such as illustrated in FIG. 7, in which different sensor assemblies are arranged to determine flow at different radial positions of the cross section of the conduit.

Figure 9:
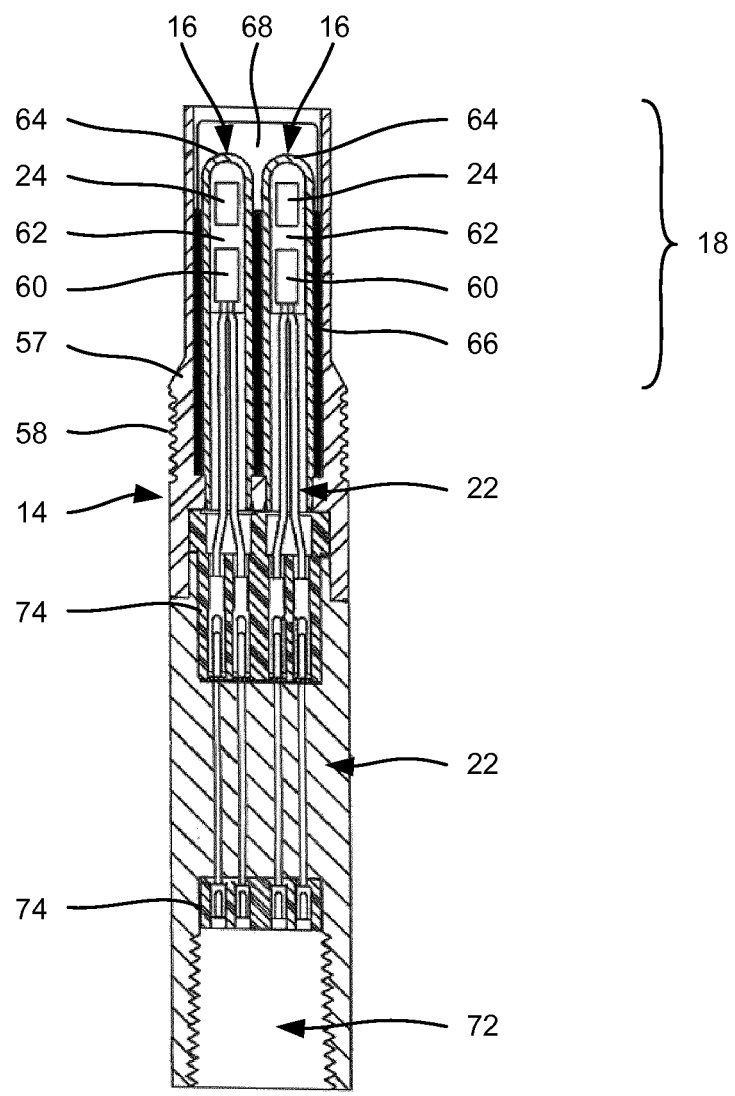
FIG. 9 is a schematic cross-sectional view of a further embodiment of a device.

FIG. 9 shows a further exemplary embodiment of a sensor assembly 12 according to embodiments of the present invention. It will be appreciated that like reference numerals are used to denote features of the embodiment of FIG. 9 which are equivalent to the features of the embodiments of FIGS. 1 to 8.

The sensor assembly 12 is configured to measure the velocity of a fluid flowing through a conduit such as the conduit 10 of FIGS. 1, 4 and 8. A housing 14 of the sensor assembly 12 comprises a body portion 57 which defines a screw thread 58 configured to engage a correspondingly threaded portion of an opening of the conduit 10, such as the opening 20 of FIG. 1. When the screw thread 58 is engaged by the opening 20, an exposed portion 18 of the sensor assembly 12 is placed in fluid flow communication with fluid flowing in the conduit 10. That is to say, the exposed portion 18 extends into the conduit 10, such as that shown in the arrangement of FIG. 1.

The exposed portion 18 of the sensor assembly 12 comprises a pair of sensors 16. Each of the sensors 16 comprises a heating element 24 and a thermocouple 60 which are mounted upon a carrier 62. The heating element 24, thermocouple 60 and carrier 62 are contained within a shell 64. The carrier 62 may be held in position within the shell 64 using a thermally conductive adhesive such as for example a silver paste adhesive. During manufacture, the carrier 62 may be pressed against the terminal end of the shell 64, so as to provide improved thermal contact therebetween. The sensor assembly 12 comprises a sleeve 66 having a pair of axially extending bores configured to receive the shells 64 of the sensors 16. The shells 64 of the sensors 16 may be held in place relative to the sleeve 66 by any convenient means, such as for example by friction and/or adhesive. In particular, the sleeve 66 may be moulded around the shells 64 so as to create a mechanical shrink-fit between the sleeve 66 and the shells 64. The sleeve 66 is received by the body portion 57 of the housing 14. Likewise, the sleeve 66 may be held in place relative to the housing 14 by any convenient means, such as for example by friction, adhesive, shrink-fitting or a combination thereof.

The housing 14 further comprises a base portion 70 which couples to the body portion 57. During use, the base portion 70 is configured to be located outside of the conduit 10. The base portion 70 comprises a receptacle portion 72 which is configured to provide an electrical connection with a control and/or analysis module (such as the CTRL module 34 and ANSIS module 36 of FIG. 4). The sensor assembly 12 comprises a databus 22 comprising leads or wires which extend from the heating elements 24 and thermocouples 60 to the receptacle portion 72. The databus 22 may comprise one or more sets of contact blocks 74 configured to transmit electrical signals from the heating elements 24 and thermocouples 60 to the control and/or analysis modules. In some embodiments, the base portion 70 may comprise a radiant barrier material.

The body portion 57 of the housing 14 extends beyond the terminal ends of the shells 64 of the sensors 16 to form a protective cage. The protective cage prevents solid materials carried by the fluid flowing in the conduit 10 from damaging the shells 64 of the sensors 16. The cage defines an open section 68 which is configured to permit the terminal ends of shell 64 to be directly exposed to the fluid flowing in the conduit 10. It will be appreciated that the terminal ends of the shells 64 are the portions of each shell 64 which extend beyond the sleeve 66 away from the thread 58 of the body portion 57. Because the terminal ends of the shells 64 are directly exposed to the fluid flowing in the conduit 10, it will be appreciated that the terminal ends of the shells 64 may be considered to define a portion of an exterior of the housing 14. The area defined by the terminal ends of each shell 64 is smaller than the area of each shell 64 which is surrounded by the sleeve 66.

The shells 64 may be composed of any material having a high thermal conductivity (i.e. a thermally conductive material). Such thermally conductive materials may be, for example, metals or metal containing-composites which comprise platinum, gold or the like. The sleeve 66 is composed of a material having low thermal conductivity (i.e. a thermally insulating material). Such thermally insulating materials may be, for example, polymers or polymer-composites such as Polyether ether ketone (PEEK) or ceramic materials such as glass. It will be appreciated that the shells 64 and sleeve 66 may be composed of substantially any suitable material, provided that the thermal conductivity of the shells 64 is substantially greater than that of the sleeve 66.

During use, one or both of the heating elements 24 transmits heat into the fluid 10. As previously described, by measuring a property of the heating element 24, such as for example its resistance, the rate of heat transfer and hence the velocity of the fluid flowing in the conduit 10 can be calculated. Because the shells 64 are composed of a thermally conductive material and the sleeve 66 is composed of a thermally insulating material, it will be appreciated that the sleeve 66 insulates the portion of the shells 64 which it surrounds. However, the sleeve 64 does not insulate the terminal ends of the shells 64 which are directly exposed to the fluid flowing in the conduit 10. As such, the rate of heat transmission from the heating element 24 to the fluid flowing in the conduit 10 via the terminal ends of the shells 64 is greater than the rate of heat transmission from the heating element 24 to the fluid via the sleeve 66. The sleeve 66 and shells 64 act in combination to concentrate the heat generated by the heating elements 24 at the terminal ends of the shells 64, and therefore the amount of electrical energy required to power the heating elements 24 is reduced.

The carriers 62 are, in an embodiment, made from a rigid material. This provides the advantage that the position of the heating elements 24 relative to the thermocouples 60 within each sensor 16 can be precisely controlled in comparison to an embodiment in which the heating elements 24 and thermocouples 60 are held within a powder (such as, for example, alumina). For example, if the heating elements 24 and thermocouples 60 are misaligned by 1 mm, the temperature sensed by the thermocouple 60 could vary in the region of 0.5 to 2° C. from the temperature which would have been sensed were the heating elements 24 and thermocouples 60 at their correct (i.e. nominal) positions. It will be appreciated that by providing a rigid carrier 62 the sensors 16 may therefore be calibrated more easily and thus the accuracy of the sensors 16 is improved.

Furthermore, each of the carriers 62 is composed of a material having a high thermal conductivity. In an embodiment, the carriers 62 are composed of a material having a thermal conductivity greater than about 300 W·m$^{-1}$·K$^{-1}$ such as, for example, copper and/or gold. In embodiments where the carriers 62 are composed of copper and/or gold, the resistance to heat transfer via conduction within the carriers 62 themselves is negligible. In comparison, where the heating elements 24 and thermocouples 60 are held in position using alumina, the temperature difference between the terminal and proximal ends of the carriers 62 (i.e. the longitudinally opposite ends of the carriers 64) is likely to be in the order of 2 to 3° C. In embodiments in which the copper and/or gold is used for the carriers 62, the temperature difference between the terminal and proximal ends of the carries 62 is likely to be within the order of 0.2 to 0.3° C. This is because the thermal conductivity of Alumina is approximately one order of magnitude below that of copper and/or gold. Providing a carrier composed of copper and/or gold therefore acts to reduce any detrimental effects associated with the presence of a heat gradient within the sensors 16, which may cause inaccuracies in the measured flow rate.

It will be appreciated that heat transfer from the heating element 24 to the fluid flowing in the conduit 10 is driven by the temperature difference therebetween. As such, in order to determine the amount of heat which is dissipated by the fluid (and therefore the flow rate of the fluid) it is necessary to determine the bulk temperature of the fluid flowing in the conduit. In the present embodiment, the thermocouples 60 of the sensors 16 are used to determine the bulk temperature of the fluid flowing in the conduit 10. For example, during use the heating element 24 of a first one of the sensors 16 may be active such that the first sensor is able to measure the flow rate of the fluid flowing in the conduit. At the same time, the heating element 24 of a second one of the sensors may be inactive, and the bulk temperature of the fluid flowing in the conduit 10 may be measured by the thermocouple 60 of the second sensor 16. It will be appreciated that this may improve the accuracy of the fluid velocity measurement determined by the sensing assembly 12.

Furthermore, this operation may be periodically reversed such that the heating element 24 of the second sensor is activated when the heating element 24 of the first sensor is deactivated. In this case the thermocouple of the first sensor 16 will be used to provide the baseline temperature. It will be appreciated that by only activating one of the heating elements 24, the overall power required by the sensing assembly 12 is reduced compared to the situation in which both of the heating elements 24 are activated. It will be appreciated that although the embodiment described above determines the bulk temperature of the fluid flowing in the conduit so as to calculate the flow rate of the fluid, in other embodiments a bulk temperature of the fluid may be assumed based upon an expected temperature of the fluid. That is to say, the flow rate may be calculated based upon a pre-determined reference value of the bulk fluid temperature, and not a bulk fluid temperature which has been measured by a thermocouple or otherwise.

It will be appreciated that by providing two sensors 16, in the event that one of the sensors 16 fails, the sensing assembly 12 will still be able to determine the velocity of the fluid flowing in the conduit 10 as the other of the sensors 16 will be working. As such, the provision of two sensors 16 creates redundancy in the sensing assembly 12, thus meaning the sensing assembly 12 can continue to function even when damaged. However, it will be appreciated that although the embodiment of FIG. 9 is described as comprising two sensors 16, it will be appreciated that in alternative embodiments the sensor assembly 12 may comprise any suitable number of sensors, for example a single sensor 16.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

What is claimed is:

1. A device for measuring the rate of flow of a fluid comprising:
   a heating element;
   a housing, the heating element being located in an interior of the housing, the housing defining a first thermal path from the heating element to a first region of an exterior of the housing and a second thermal path from the heating element to a second region of the exterior of the housing; and
   a detector inside the housing configured to detect a property associated with transfer of heat from the heating element to the exterior of the housing, wherein the detector is spaced apart from the heating element inside the housing;
   wherein the first thermal path has a first thermal conductivity and the second thermal path has a second thermal conductivity;
   wherein the first thermal conductivity is greater than the second thermal conductivity; and
   wherein the area of the first region of the exterior of the housing is smaller than the area of the second region of the exterior of the housing.

2. The device according to claim 1, wherein the first and second thermal paths are paths of heat conduction.

3. The device according to claim 1, wherein the power density of heat transferred through the first region of the exterior of the housing is greater than the power density of heat transferred through the second region of the exterior of the housing.

4. The device according to claim 1, wherein the heating element is enclosed within a rigid carrier positioned in the interior of the housing.

5. The device according to claim 4, wherein the carrier comprises a material having a thermal conductivity greater than about 300 $W \cdot m^{-1} \cdot K^{-1}$.

6. The device according to claim 1, wherein the housing comprises a shell within which the heating element is located, the shell being partially received within a sleeve; and
   wherein the first thermal conductivity is determined by the material of the shell, and the second thermal conductivity is determined by the material of the sleeve.

7. The device according to claim 6, wherein the portion of the shell which is not received by the sleeve is directly exposed to the fluid so as to define the first region of the exterior of the housing.

8. The device according to claim 6, wherein the sleeve is at least partially received within a body portion of the housing.

9. The device according to claim 6, wherein the heating element and shell define a first sensor, and wherein the device comprises a second sensor substantially identical to the first sensor.

10. The device according to claim 9, wherein at least one of the first and second sensors comprises a thermocouple or platinum resistance thermometer.

11. The device according to claim 1, wherein the housing comprises a protective cage configured to prevent solid materials carried by the fluid from contacting the first region of the exterior of the housing.

12. The device according to claim 1, wherein the property is a temperature.

13. The device according to claim 1, wherein the property is an electrical resistance of the heating element.

14. The device according to claim 1, wherein the device is configured to be inserted in a conduit, and wherein the housing comprises an exposed portion which, in use, is exposed to fluid within the conduit and an external portion which, in use, is external to the conduit.

15. The device according to claim 14, wherein the external portion comprises a radiant barrier material.

16. The device according to claim 1, wherein the first region is adjacent to at least one of the heating element and the detector.

17. The device according to claim 1, further comprising an analysis module arranged to receive the property and to generate a measure of flow of fluid based upon the property.

18. The device according to claim 1, wherein a property of the heating element is configured based upon the first and second thermal paths.

19. A system for controlling rate of flow of a fluid in a conduit, the system comprising:
    a device for measuring the flow of fluid; and
    a controller arranged to control flow of the fluid in the conduit based upon output of the device;
    wherein the device comprises:
        a heating element;
        a housing, the heating element being located in an interior of the housing, the housing defining a first thermal path from the heating element to a first region of an exterior of the housing and a second thermal path from the heating element to a second region of the exterior of the housing; and
        a detector inside the housing and configured to detect a property associated with transfer of heat from the heating element to the exterior of the housing, wherein the detector is spaced apart from the heating element inside the housing;
        wherein the first thermal path has a first thermal conductivity and the second thermal path has a second thermal conductivity;
        wherein the first thermal conductivity is greater than the second thermal conductivity; and
        wherein the area of the first region of the exterior of the housing is smaller than the area of the second region of the exterior of the housing.

20. The system according to claim 19, further comprising, the conduit;
    wherein the device is adapted to be received in an opening in the conduit.

21. A device for measuring the rate of flow of a fluid within a conduit, the device comprising:
    a housing, wherein the housing includes an open section that permits the fluid in the conduit to enter a portion of the housing;
    a first shell within the housing, wherein the first shell includes a terminal end that is exposed to the fluid in the housing;
    a first heating element within the first shell;
    a first thermocouple spaced apart from the first heating element within the first shell, wherein the first thermocouple is configured to measure the temperature of the fluid in the housing; and
    a sleeve that surrounds the first shell within the housing.

22. The device of claim 21, further comprising:
    a second shell surrounded by the sleeve within the housing, wherein the second shell includes a terminal end that is exposed to the fluid in the housing;
    a second heating element within the second shell; and
    a second thermocouple spaced apart from the second heating element within the second shell, wherein the second thermocouple is configured to measure the temperature of the fluid in the housing.

* * * * *